United States Patent
Wang et al.

(10) Patent No.: US 10,462,235 B2
(45) Date of Patent: Oct. 29, 2019

(54) GLOBAL PROVISIONING OF MILLIONS OF USERS WITH DEPLOYMENT UNITS

(71) Applicant: Microsoft Technology Licensing, LLC, Redmond, WA (US)

(72) Inventors: Weidong Wang, Lexington, MA (US); Thomas D. Sanfilippo, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 854 days.

(21) Appl. No.: 14/702,679

(22) Filed: May 2, 2015

(65) Prior Publication Data
US 2015/0381747 A1    Dec. 31, 2015

Related U.S. Application Data

(63) Continuation of application No. 11/418,687, filed on May 5, 2006, now Pat. No. 9,049,268.

(51) Int. Cl.
*H04M 3/42*    (2006.01)
*H04L 29/12*   (2006.01)
(Continued)

(52) U.S. Cl.
CPC ............. *H04L 67/18* (2013.01); *G06Q 10/06* (2013.01); *G06Q 10/10* (2013.01);
(Continued)

(58) Field of Classification Search
CPC . H04L 67/1002; H04L 67/1008; H04L 29/06; H04L 67/101; H04L 67/1021;
(Continued)

(56) References Cited

U.S. PATENT DOCUMENTS 5,557,678 A * 9/1996 Ganesan ............... H04L 9/0822
380/239
6,668,272 B1    12/2003 Keller et al.
(Continued)

FOREIGN PATENT DOCUMENTS

CN    1322315 A    11/2001
CN    1435771 A     8/2003
(Continued)

OTHER PUBLICATIONS

"Office Action Issued in Indian Patent Application No. 05842/CHENP/2008", dated Nov. 28, 2016, 7 Pages.
(Continued)

*Primary Examiner* — Ahmad F. Matar
*Assistant Examiner* — Jirapon Intavong
(74) *Attorney, Agent, or Firm* — Liang IP, PLLC

(57) ABSTRACT

Described herein is technology for, among other things, global provisioning of a service. The technology involves a provisioning server obtaining location information for a client. The provisioning server determines an appropriate deployment unit, based on the location information, to which the client will be assigned. The provisioning server transmits assignment information for the appropriate deployment unit to the client. The client then communicatively couples to the assigned deployment unit and begins receiving the service from the deployment unit.

20 Claims, 7 Drawing Sheets

(51) Int. Cl.
*H04L 29/08* (2006.01)
*G06Q 10/06* (2012.01)
*G06Q 10/10* (2012.01)
*H04L 12/911* (2013.01)

(52) U.S. Cl.
CPC .. *H04L 29/12122* (2013.01); *H04L 29/12792* (2013.01); *H04L 47/781* (2013.01); *H04L 61/1547* (2013.01); *H04L 61/1552* (2013.01); *H04L 61/60* (2013.01); *H04L 61/609* (2013.01)

(58) Field of Classification Search
CPC . H04L 67/2814; H04L 67/02; H04L 67/1029; H04L 47/125; H04L 61/2514
USPC ..................................................... 379/201.12
See application file for complete search history.

(56) References Cited

U.S. PATENT DOCUMENTS

| | | | |
|---|---|---|---|
| 6,782,352 | B2 | 8/2004 | Wen et al. |
| 6,799,214 | B1 | 9/2004 | Li |
| 6,898,435 | B2 | 5/2005 | Milman |
| 2001/0021646 | A1 | 9/2001 | Antonucci et al. |
| 2002/0039411 | A1* | 4/2002 | Sabinson ............... H04M 3/42 379/221.08 |
| 2002/0059622 | A1 | 5/2002 | Grove et al. |
| 2002/0112155 | A1 | 8/2002 | Martherus et al. |
| 2002/0156874 | A1 | 10/2002 | Suorsa et al. |
| 2003/0027581 | A1 | 2/2003 | Jokinen et al. |
| 2003/0079027 | A1 | 4/2003 | Slocombe et al. |
| 2003/0126203 | A1 | 7/2003 | Wen et al. |
| 2003/0174683 | A1 | 9/2003 | Vegge |
| 2003/0195984 | A1 | 10/2003 | Zisapel et al. |
| 2004/0083307 | A1* | 4/2004 | Uysal ....................... H04L 67/16 709/246 |
| 2004/0116131 | A1 | 6/2004 | Hochrainer et al. |
| 2004/0122958 | A1* | 6/2004 | Wardrop ........... G06F 17/30206 709/229 |
| 2004/0192332 | A1 | 9/2004 | Samn |
| 2004/0242240 | A1 | 12/2004 | Lin |
| 2005/0021738 | A1* | 1/2005 | Goeller ............. H04L 29/12009 709/224 |
| 2007/0055674 | A1 | 3/2007 | Sunada |
| 2010/0257258 | A1* | 10/2010 | Liu .................... H04L 29/12066 709/220 |

FOREIGN PATENT DOCUMENTS

| | | | |
|---|---|---|---|
| JP | 2003256308 | * | 9/2003 |
| JP | 2004086697 | A | 3/2004 |
| JP | 2006039738 | A | 2/2006 |
| KR | 20020029441 | A | 4/2002 |
| RU | 2249843 | C2 | 4/2005 |
| RU | 2004115751 | A | 10/2005 |
| RU | 2273107 | C2 | 3/2006 |
| WO | 9905584 | A2 | 2/1999 |
| WO | 1999048009 | A1 | 9/1999 |
| WO | 0148622 | A1 | 7/2001 |
| WO | 0190911 | A1 | 11/2001 |
| WO | 2005125148 | A1 | 12/2005 |

OTHER PUBLICATIONS

"Office Action Issued in Thailand Patent Application No. 0701002224", dated Sep. 19, 2017, 3 Pages.
"Web Server Director", Retrieved from:«https://web.archive.org/web/20110516053929/http://www.netbriar.com/pdf/WSD.pdf», Retrieved on: May 16, 2011, 6 Pages.
"Office Action and Search Report Issued in Taiwanese Patent Application No. 096115776", dated Oct. 16, 2013, 11 Pages.
"Office Action Issued in Korean Patent Application No. 1020087027043", dated Jul. 30, 2013, 10 Pages.
"Final Office Action Issued in U.S. Appl. No. 11/418,687", dated Nov. 12, 2010, 18 Pages.
"Final Office Action Issued in U.S. Appl. No. 11/418,687", dated Mar. 16, 2012, 23 Pages.
"Final Office Action Issued in U.S. Appl. No. 11/418,687", dated Feb. 13, 2014, 24 Pages.
"Non Final Office Action Issued in U.S. Appl. No. 11/418,687", dated Jun. 5, 2014, 25 Pages.
"Non Final Office Action Issued in U.S. Appl. No. 11/418,687", dated Jun. 21, 2013, 23 Pages.
"Non Final Office Action Issued in U.S. Appl. No. 11/418,687", dated Sep. 1, 2011, 21 Pages.
"Non Final Office Action Issued in U.S. Appl. No. 11/418,687", dated Nov. 3, 2009, 18 Pages.
"Non Final Office Action Issued in U.S. Appl. No. 11/418,687", dated Apr. 30, 2010, 22 Pages.
"Fourth Office Action Issued in Chinese Patent Application No. 200780015870.4", dated Sep. 6, 2012, 6 Pages.
"Fifth Office Action Issued in Chinese Patent Application No. 200780015870.4", dated Feb. 8, 2013, 7 Pages.
"Third Office Action Issued in Chinese Patent Application No. 200780015870.4", dated Feb. 23, 2012, 7 Pages.
"First Office Action Issued in Chinese Patent Application No. 200780015870.4", dated Nov. 27, 2009, 19 Pages.
"Office Action Issued in Russian Patent Application No. 2008143608", dated Apr. 17, 2011, 7 Pages.
"Office Action Issued in Japanese Patent Application No. 2009-509749", dated Jan. 13, 2013, 5 Pages.
"Office Action Issued in Japanese Patent Application No. 2009-509749", dated: Sep. 16, 2011, 6 Pages.
"Office Action Issued in Brazil Patent Application No. PI0711095-2", dated Apr. 6, 2018, 5 Pages.
Huedo, et al., "Experiences on Grid Resource Selection Considering Resource Proximity", Retrieved from: «http://springerlink.metapress.com/(stelar55jguulezosaspmvnt)/app/home/contribution.asp??referrer», 2004, 1 Page.
"International Search Report and Written Opinion Issued in PCT Application No. PCT/US2007/010874", dated Nov. 5, 2007, 7 Pages.
Ratnasamy, et al., "Topologically-Aware Overlay Construction and Server Selection", In Proceedings of Twenty-First Annual Joint Conference of the IEEE Computer and Communications Societies, vol. 3, Jun. 27, 2002, 11 Pages.
Wong, et al., "ClosestNode.com: An Open Access, Scalable, Shared Geocast Service for Distributed Systems", In ACM SIGOPS Operating Systems Review, Jan. 2006, 3 Pages.
"Second Office Action Issued in Chinese Patent Application No. 200780015870.4", dated Jun. 9, 2011, 11 Pages.

* cited by examiner

430

440

GLOBAL PROVISIONING OF MILLIONS OF USERS WITH DEPLOYMENT UNITS

CROSS-REFERENCE TO RELATED APPLICATIONS

This application is a Continuation of co-pending patent application Ser. No. 11/418,687 entitled "GLOBAL PROVISIONING OF MILLIONS OF USERS WITH DEPLOYMENT UNITS", filed May 5, 2006.

BACKGROUND

Over the years, the internet has evolved from a simple means of publishing information to a resource-rich multimedia environment. Due to the proliferation of broadband technology in homes and business, opportunities have arisen for providing various types of services over the internet. Some of these services help to streamline global businesses. For example, one type of technology allows people working in offices on opposite sides of the globe to collaborate in a virtual office environment. Such services are generally hosted by one or more servers.

As demand for such services increases, it will become necessary to provide more servers to host the services. Moreover, if the service is provided globally, it may be desirable to scatter the servers to different geographic regions (e.g., one server in the U.S. and one server in Asia) in order to provide greater bandwidth to each respective region. Furthermore, if a region experiences a particularly heavy load, it may also be desirable to further sub-divide that region (e.g., a West Coast U.S. server, a Midwest U.S. server, and an East Coast U.S. server).

Thus, with servers scattered in different geographic locations, it will be desirable to provision the service in such a way that each user of the service is assigned to an appropriate server so that bandwidth and system performance can be optimized.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, global provisioning of a service. The technology involves a new client providing its location information to a provisioning server. The location information may include, but is not limited to, the client's regional ID and time zone. The provisioning server determines an appropriate deployment unit, based on the location information, to which the new client will be assigned. The provisioning server transmits assignment information for the appropriate deployment unit to the new client. The client then communicatively couples to the assigned deployment unit and begins receiving the service from the deployment unit.

In the event that, for any reason, it is desired that a particular client be reassigned from its current deployment unit to a new or different deployment unit, the current deployment unit transmits need-reassignment information to the client. The client, upon receiving the need-reassignment information, goes through the above steps to get provisioned to a different deployment unit. The client then communicatively couples with the new deployment unit as instructed in the reassignment information.

Thus, embodiments provide highly adaptable technology for globally provisioning a service. The technology is capable of intelligently assigning clients to appropriate (often the closest) deployment units for the purpose of receiving the service. Furthermore, embodiments allow for the dynamic addition or removal of a deployment unit by reassigning clients on the fly. Such architecture is ideal for supporting clients numbering in the millions.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
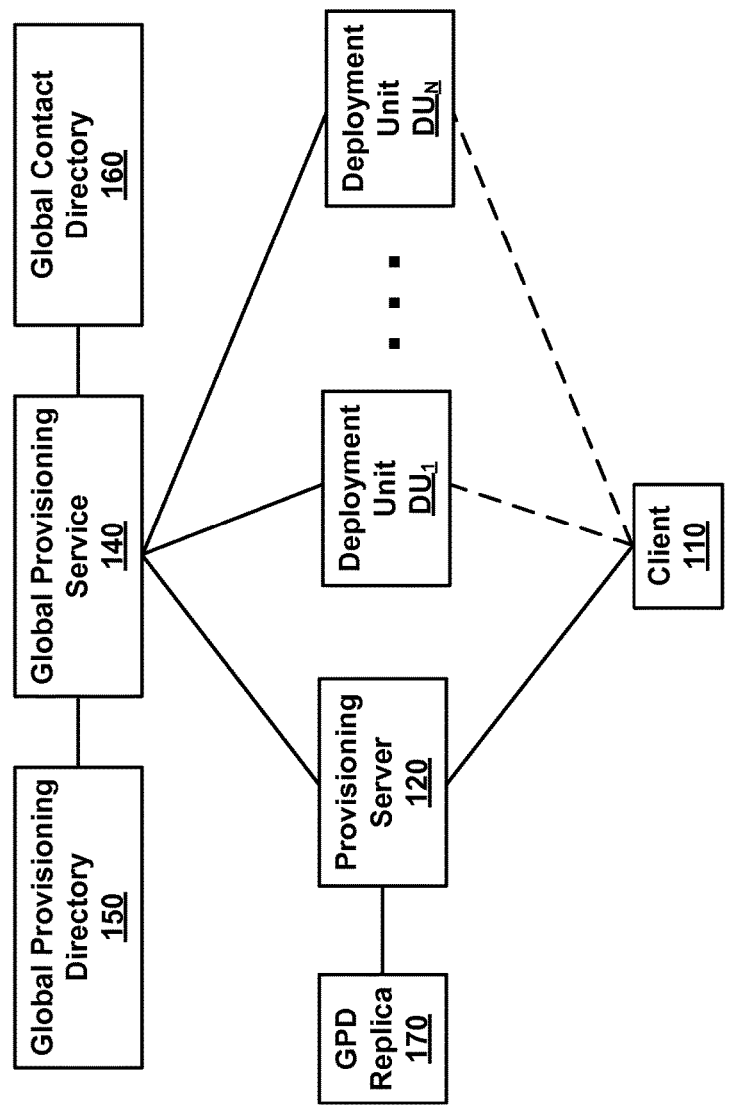
FIG. 1 is a block diagram illustrating a system for global provisioning of a service, in accordance with an embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Briefly stated, embodiments involve a provisioning server obtaining location information for a client. The provisioning server determines an appropriate deployment unit, based on the location information, to which the client will be assigned. The provisioning server transmits assignment information for the appropriate deployment unit to the client. The client then communicatively couples to the assigned deployment unit and begins receiving the service from the deployment unit.

FIG. 1 illustrates a system 100 for global provisioning of a service, in accordance with an embodiment. Although FIG. 1 depicts a hardware system, it should be appreciated that the embodiments described herein are well-suited for implementation in software, wherein the functions of components in FIG. 1 are performed by equivalent software modules on separate hardware systems.

The service provided by system 100 may be any service that is well-suited for global provisioning. In one embodiment, the service is a virtual office service. System 100 includes deployment units $DU_1$ to $DU_N$. In their most basic form, deployment units $DU_1$ to $DU_N$ provide the service to clients (such as client 110). System 100 also includes provisioning server 120. It should be appreciated that although only one provisioning server is depicted in FIG. 1, system 100 is well-suited to comprise multiple provisioning servers across geographical locations so as to appropriately handle the client-load.

In one embodiment, when an individual user is ready to create an account with the service, the client 110 will first connect to a provisioning server 120. At this point, the provisioning server 120 will obtain the client's location information. In one embodiment, the location information is obtained from the global network routing infrastructure. In another embodiment, the client 110 transmits its location information to the provisioning server 120. In yet another embodiment, the combination of client-sent location information and the location information obtained from the global network routing infrastructure is used. The location information may include, but is not limited to, a geographic ID, such as a country identifier, and the client's time zone. The location information may also include an account ID, an account certificate, a license type, and a transaction ID.

System 100 also includes a global provisioning service 140, which is communicatively coupled with provisioning servers like provisioning server 120 and a number of databases. Upon receiving the location information from the client 110, the provisioning server will contact the global provisioning service 140, which will in turn provide assignment information for the client 110. For example, if a client's geographic ID corresponds to the United States, and the client's time zone is Pacific Standard Time, the global provisioning service 140 will assign the client to a U.S. West Coast deployment unit. In one embodiment, each deployment unit may support only certain license types. For example, a U.S. East Coast deployment may support license types A and B, while a U.S. West Coast deployment unit only supports type A licenses. Thus, if the client from the previous example has a type B license, the global provisioning service would assign the client to the U.S. East Coast deployment unit because the U.S. West Coast deployment unit does not support the client's license. The assignment information provided by the global provisioning server 140 may include, but is not limited to a URL corresponding to the assigned deployment unit, a certificate corresponding to the assigned deployment unit, an authorization token, and a hash code.

In one embodiment, the databases to which the global provisioning service is coupled include a global provisioning directory (GPD) 150, which hosts information about deployment units $DU_1$-$DU_N$. This information may include, but is not limited to, the deployment units' names and locations, URLs and certificates corresponding to the deployment units, the deployment units' user capacity information, the types of licenses supported by the deployment units, etc.

Once the provisioning server 120 receives the assignment information from the global provisioning service 140 it will in turn relay the assignment information back to the client 110. In response, the client 110 will then communicatively couple with the deployment unit indicated in the assignment information (e.g., $DU_1$). Once the client 110 is coupled with its respective deployment unit (e.g., $DU_1$), it can then begin receiving the service from that deployment unit.

In one embodiment, the databases to which the global provisioning service is coupled include a global contact directory 160, which hosts contact information for users of the system 100. In one embodiment, the global contact directory is an opt-in feature. Thus, users (e.g., client 110) may elect to publish certain contact information to the global contact directory 160. The contact information stored in the global contact directory 160 may include, but is not limited to, names, email addresses, vCards, phone numbers, etc. Because publication to the global contact directory may be optional, the publication may occur at any time. For example, client 110 may publish its contact information via the provisioning server 120 when it is requesting the assignment information. Alternatively, client 110 may publish its contact information via its respective deployment unit (e.g., $DU_1$) after it has received its deployment unit assignment.

In one embodiment, system 100 includes a GPD replica 170 communicatively coupled with the provisioning server 120. Ideally, the GPD replica 170 is proximately located to the provisioning server 120. The benefit of having the GPD replica 170 is that provisioning server 120 can make the provisioning decision itself based on the information in the GPD replica 170, rather than obtaining the assignment information from the global provisioning service 140. This shortens the amount of time necessary to provision a client and reduces the bandwidth usage of the global provisioning service 140. If each provisioning server in system 100 (such as provisioning server 120) is coupled with a respective GPD replica (such as GPD replica 170), the global provisioning service 140 then only needs be concerned with managing modifications and queries to the global contact directory and periodically synchronizing the GPD replicas (such as GPD replica 170) with the original GPD 150.

As the number of clients accessing the service in a particular region (e.g., the United States) increases, it may be necessary to add one or more new deployment units (e.g., $DU_{N+1}$, $DU_{N+2}$, etc., not shown) to the system 100. For example, if the United States currently has a West Coast and an East Coast deployment unit, both of which are approaching their capacity limits, system 100 will then allow for the dynamic addition of, for instance, a Midwest deployment unit. Once the new deployment unit is in place and operational, it is desirable to reassign some clients to the new deployment unit in order to distribute the load more evenly. Re-provisioning clients to new or different deployment units may be desirable in other situations as well, such as reassigning a client if it is moved from one region to another or moving a particular class of users (e.g., beta users) to a particular deployment unit (e.g., for dedicated beta testing). If there are specific deployment units for those clients to be moved to, the deployment unit will mark in the global database for those clients. In such cases, the deployment units will transmit the need-reassignment information to the clients. Upon receiving the need-reassignment information, the clients will go through the same provisioning steps by contacting a provisioning server. If a client has moved, due to its location change, it will now be assigned to a different deployment unit closer to it. If the corresponding record in the global database has been marked, the client will be assigned to a pre-assigned deployment unit. The reassigned clients will then reconnect to the appropriate deployment unit. It should be appreciated that similar functions may be employed in the event that a deployment unit is removed from system 100.

Figure 2:
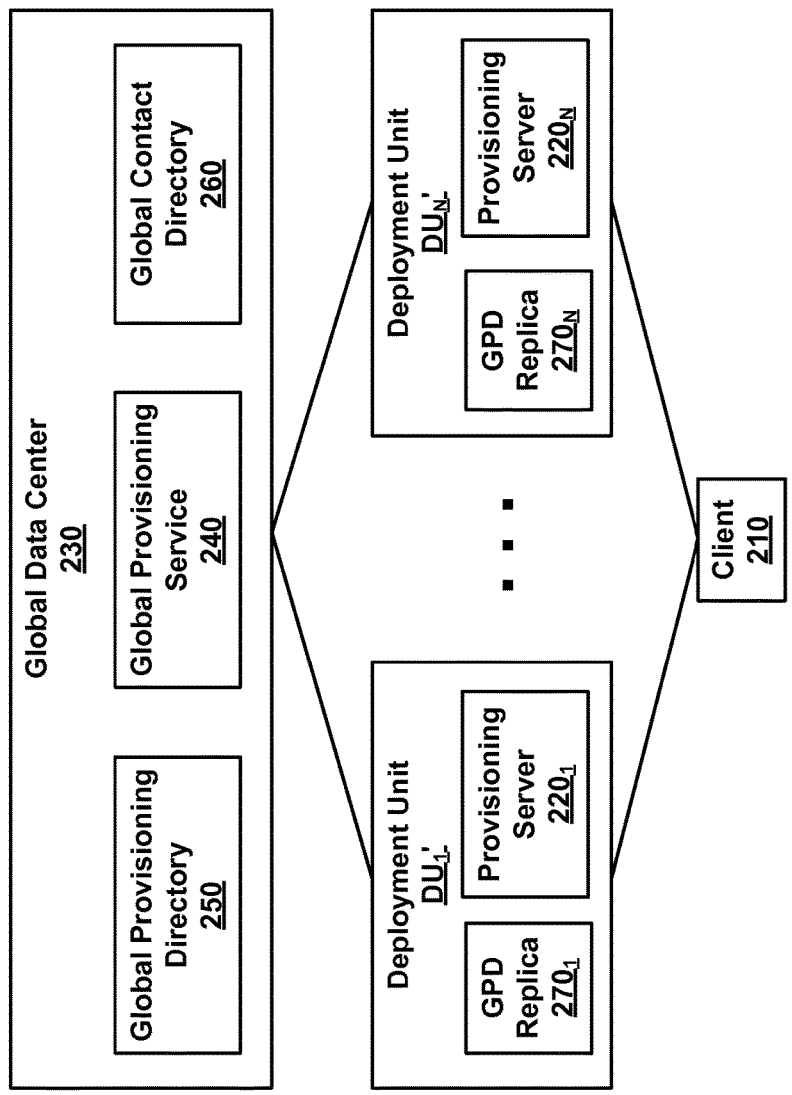
FIG. 2 is a block diagram illustrating a system for global provisioning of a service, in accordance with an exemplary embodiment.

FIG. 2 illustrates a system 200 for global provisioning of a service, in accordance with an exemplary embodiment. Although FIG. 1 depicts a hardware system, it should be appreciated that the embodiments described herein are well-suited for implementation in software, wherein the functions of components in FIG. 1 are performed by equivalent software modules.

In system 200, provisioning servers $220_1$-$220_N$ and GPD replicas $270_1$-$270_N$ are integrated within respective deployment units $DU_1'$ and $DU_N'$. Moreover, global provisioning service 240, GPD 250, and global contact directory 260 are integrated within a global data center 230. Functionally, system 200 operates similar to system 100.

In one embodiment, when an individual user is ready to create an account with the service, the client 210 will first connect to a provisioning server (e.g., 2200, which is integrated within a respective deployment unit (e.g., $DU_1'$).

In one embodiment, the provisioning servers have a well-known name or alias (e.g., provision.groove.microsoft.com), which is built into client 210. The provisioning server (e.g., $220_1$) will obtain the client's location information. In one embodiment, the location information is obtained from the global network routing infrastructure. In another embodiment, the client 210 transmits its location information to the provisioning server (e.g., $220_1$). In yet another embodiment, the combination of client-sent location information and the location information obtained from the global network routing infrastructure is used. The location information may include, but is not limited to, a geographic ID, such as a country identifier, and the client's time zone. The location information may also include an account ID, an account certificate, a license type, and a transaction ID.

Upon receiving the location information from the client 210, the provisioning server (e.g., $220_1$) will contact the global provisioning service 240, which is integrated within the global data center 230. The global provisioning service 240 will in turn provide assignment information for the client 210. The assignment information provided by the global provisioning server 240 may include, but is not limited to a URL corresponding to the assigned deployment unit (e.g., $DU_N'$), a certificate corresponding to the assigned deployment unit, an authorization token, and a hash code.

In one embodiment, GPD 250 integrated within global data center 230 hosts information about deployment units $DU_1'$-$DU_N'$. This information may include, but is not limited to, the deployment units' names and locations, URLs and certificates corresponding to the deployment units, the deployment units' user capacity information, the types of licenses supported by the deployment units, etc.

Once the provisioning server (e.g., $220_1$) receives the assignment information from the global provisioning service 240 it will in turn relay the assignment information back to the client 210. In response, the client 210 will then communicatively couple with the deployment unit indicated in the assignment information (e.g., $DU_N'$). Once the client 210 is coupled with its assigned deployment unit (e.g., $DU_N'$), it can then begin receiving the service from that deployment unit. As shown, it is entirely possible in system 200 that the deployment unit to which client 210 is assigned (e.g., $DU_N'$) is a different deployment unit that the one that the assignment information was originally received from (e.g. $DU_1'$).

In one embodiment, global contact directory 260 integrated within global data center 230 hosts contact information for users of the system 200. In one embodiment, the global contact directory is an opt-in feature. Thus, users (e.g., client 210) may elect to publish certain contact information to the global contact directory 260. The contact information stored in the global contact directory 260 may include, but is not limited to, names, email addresses, vCards, phone numbers, etc. Because publication to the global contact directory may be optional, the publication may occur at any time. For example, client 210 may publish its contact information via the initial deployment unit (e.g., $DU_1'$) when it is requesting the assignment information. Alternatively, client 210 may publish its contact information via its assigned deployment unit (e.g., $DU_N'$) after it has received its deployment unit assignment.

GPD replicas $270_1$-$270_N$ integrated within respective deployment units $DU_1'$-$DU_N'$ allow their respective provisioning servers $220_1$-$220_N$ to make provisioning decisions themselves based on the information in the GPD replicas $270_1$-$270_N$, rather than obtaining the assignment information from the global provisioning service 240. This shortens the amount of time necessary to provision a client and reduces the bandwidth usage of the global provisioning service 240. By incorporating the GPD replicas $270_1$-$270_N$ into the deployment units $DU_1'$-$DU_N'$, the processing load on the global provisioning service 240 is greatly reduced. As such, the global provisioning service 240 then only needs be concerned with managing modifications and queries to the global contact directory 260 and periodically synchronizing the GPD replicas $270_1$-$270_N$ with the original GPD 250.

In one embodiment, system 200 is capable of reprovisioning a client (such as client 210). Scenarios in which reprovisioning of a user may be desirable or necessary include, but are not limited to, reassigning users after the addition or removal of a deployment unit from system 200, reassigning a client if it is moved from one region to another, or moving a particular class of users (e.g., beta users) to a particular deployment unit (e.g., for dedicated beta testing). In such cases, the deployment units will obtain new assignment information for the clients that are to be re-provisioned and subsequently transmit the new assignment information to the clients. The reassigned clients will then reconnect to the appropriate deployment unit.

Figure 3:
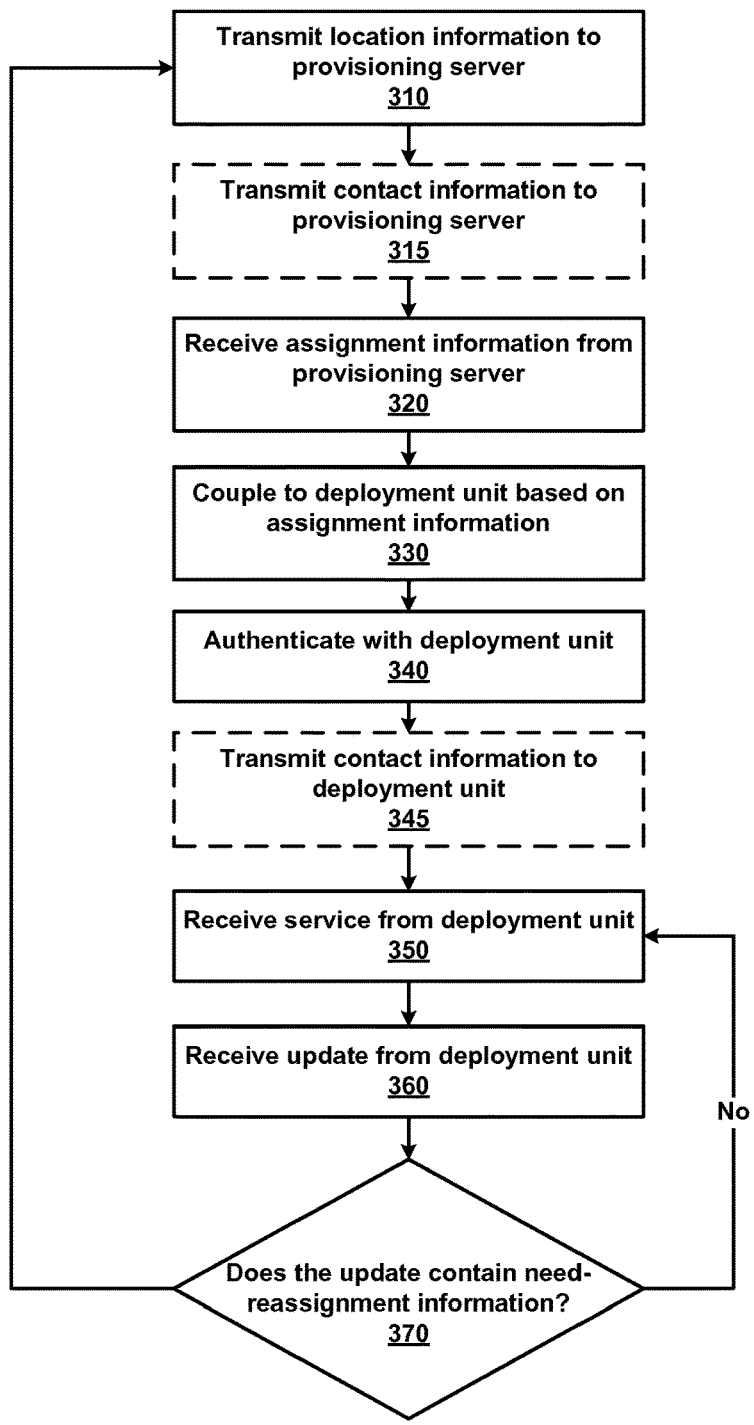
FIG. 3 is a flowchart illustrating a process for receiving global provisioning of a service in a client, in accordance with an embodiment.

FIG. 3 illustrates a process 300 for receiving global provisioning of a service in a client, in accordance with an embodiment. It should be appreciated that some embodiments may not utilize all steps depicted in FIG. 3. It should be further appreciated that some embodiments may include additional steps not depicted in FIG. 3. Steps of process 300 may be stored as instructions on a computer readable medium and executed on a computer processor.

Step 310 of process 300 involves transmitting location information to a provisioning server. The location information may include, but is not limited to, a geographic ID, such as a country identifier, and the client's time zone. The location information may also include an account ID, an account certificate, a license type, and a transaction ID.

Step 320 involves receiving assignment information from the provisioning server. The assignment information assigns the client to a particular deployment unit. The assignment information is at least in part based on the location information and may include, but is not limited to, a URL corresponding to the assigned deployment unit, a certificate corresponding to the assigned deployment unit, an authorization token, and a hash code. At step 330, the client communicatively couples to the assigned deployment unit. At step 340, the client authenticates with the deployment unit. The authentication step may include, but is not limited to, transmitting the account ID, account certificate, transaction ID, the authentication token, and the URL corresponding to the provisioning server to the deployment unit for verification. Once the client is authenticated, it may begin receiving the service (step 350) and periodic updates (step 360) from the deployment unit.

Steps 315 and 345 involve transmitting the clients contact information for inclusion in the global contact directory. These two blocks illustrate that the contact information may be submitted at various points in process 300. Moreover, it should be appreciated that the contact information may be submitted at other points in process 300 not shown in FIG. 3. In one embodiment, publishing the contact information to the global contact directory is an opt-in feature on a per-client basis.

As stated above, certain situations may arise where it becomes necessary to reassign a particular client to a different deployment unit. Reassignment information, if any, is included in the update received by the client at step 360. At step 370, process 300 determines if the update contains need-reassignment information. If not, process 300 continues normal operation and returns to step 350. If the update does contain need-reassignment information, process 300 returns to step 310 where the client 110 will go through the same provisioning steps to get assigned and communicatively couple with a new deployment unit.

Figure 4A:
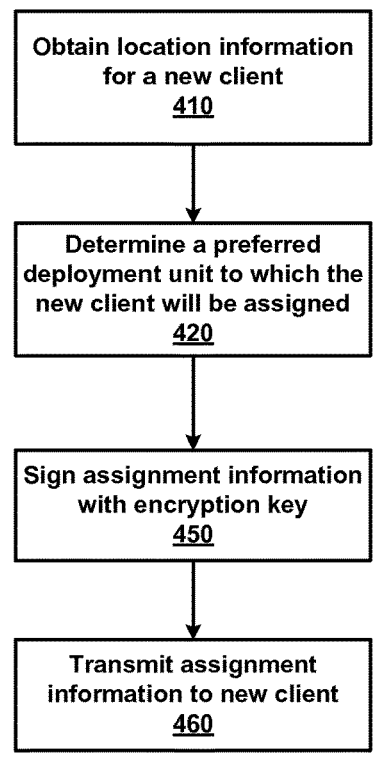
FIG. 4A is a flowchart illustrating a process for global provisioning of a service, in accordance with an embodiment.

FIG. 4A illustrates a process 400 for global provisioning of a service, in accordance with an embodiment. It should be appreciated that some embodiments may not utilize all steps depicted in FIG. 4A. It should be further appreciated that some embodiments may include additional steps not depicted in FIG. 4A. Steps of process 400 may be stored as instructions on a computer readable medium and executed on a computer processor.

Process 400 begins at step 410 by obtaining location information for a client. The location information may be obtained in a number of ways, such as directly from the client, through the global network routing infrastructure, a combination of the two, etc. The location information may include, but is not limited to, a geographic ID, such as a country identifier, and the client's time zone. The location information may also include an account ID, an account certificate, a license type, and a transaction ID.

Figure 4B:
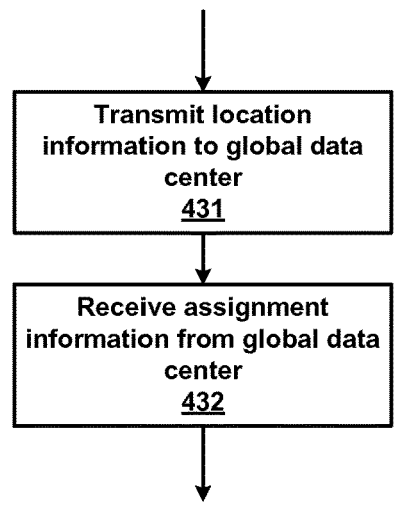
FIG. 4B is a flowchart illustrating a process for determining a preferred deployment unit to which a new client will be assigned, in accordance with an embodiment.
Figure 4C:
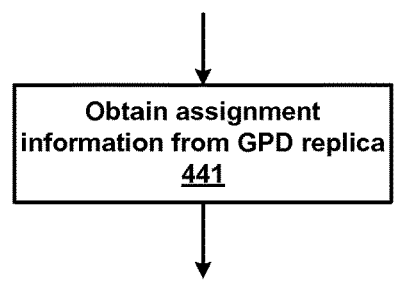
FIG. 4C is a flowchart illustrating a process for determining a preferred deployment unit to which a new client will be assigned when a GPD replica is coupled with the device utilizing the process, in accordance with an embodiment.

At step 420, a preferred deployment unit to which the client will be assigned is determined. Step 420 may be achieved in many ways. FIG. 4B illustrates a process 430 for determining a preferred deployment unit to which the client will be assigned, in accordance with an embodiment. At step 431 of process 430, the location information of the client is transmitted to the global data center. At step 432, assignment information is received from the global data center. The assignment information assigns the client to a particular deployment unit. The assignment information is at least in part based on the location information and may include, but is not limited to, a URL corresponding to the assigned deployment unit, a certificate corresponding to the assigned deployment unit, an authorization token, and a hash code. FIG. 4C illustrates a process 440 for determining a preferred deployment unit to which the client will be assigned when a GPD replica is coupled with the device utilizing processes 400 and 440, in accordance with an embodiment. At step 441, the assignment information is obtained from the GPD replica.

From step 420, process 400 next proceeds to step 450, where the assignment information is signed with an encryption key. The assignment information is then transmitted to the client (step 460).

Figure 4D:
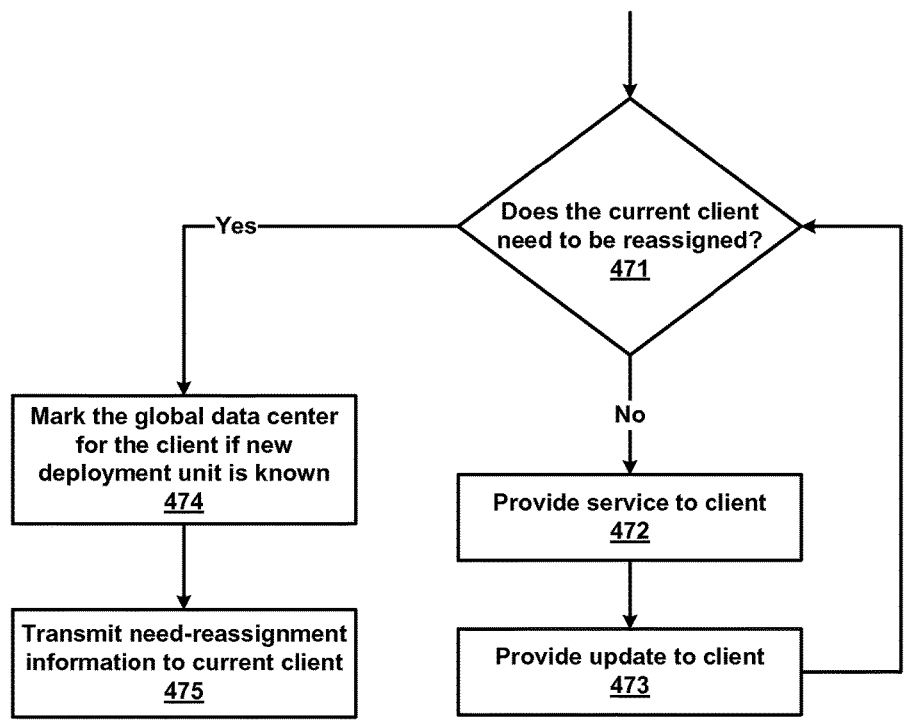
FIG. 4D is a flowchart illustrating a process for reassigning a current client to a new deployment unit, in accordance with an embodiment.

In one embodiment, the device utilizing process 400 may itself be a deployment unit and thus providing the service to other current clients. As stated above, certain situations may arise where it becomes necessary to reassign a particular current client to a different deployment unit. FIG. 4D illustrates a process 470 for reassigning a current client to a new deployment unit, in accordance with an embodiment. It should be appreciated that some embodiments may not utilize all steps depicted in FIG. 4D. It should be further appreciated that some embodiments may include additional steps not depicted in FIG. 4D. Steps of process 470 may be stored as instructions on a computer readable medium and executed on a computer processor.

At step 471, a determination is made as to whether a current client needs to be reassigned to a new deployment unit. This determination may be completely internal to the current deployment unit (e.g., the deployment unit has reached maximum capacity) or it may be the result of external variables (e.g., an instruction received from the global data center requiring the current client to be reassigned). If the current client does not need to be reassigned, the current deployment unit continues normal operations with respect to the current client and provides the service (step 472) and periodic updates (step 473) to the current client. If the current client does need to be reassigned, process 470 proceeds to step 474 where the global data center is marked for the current client if the new deployment unit is already known. At step 475, the need-reassignment information is provided to the current client, effectively causing the current client to go through the same provisioning steps to get assigned to a new deployment unit. The assignment information may be provided to the current client in a number of ways. For example, the assignment information may be provided to the current client in an update similar to the one transmitted to the client in step 473.

Figure 5:
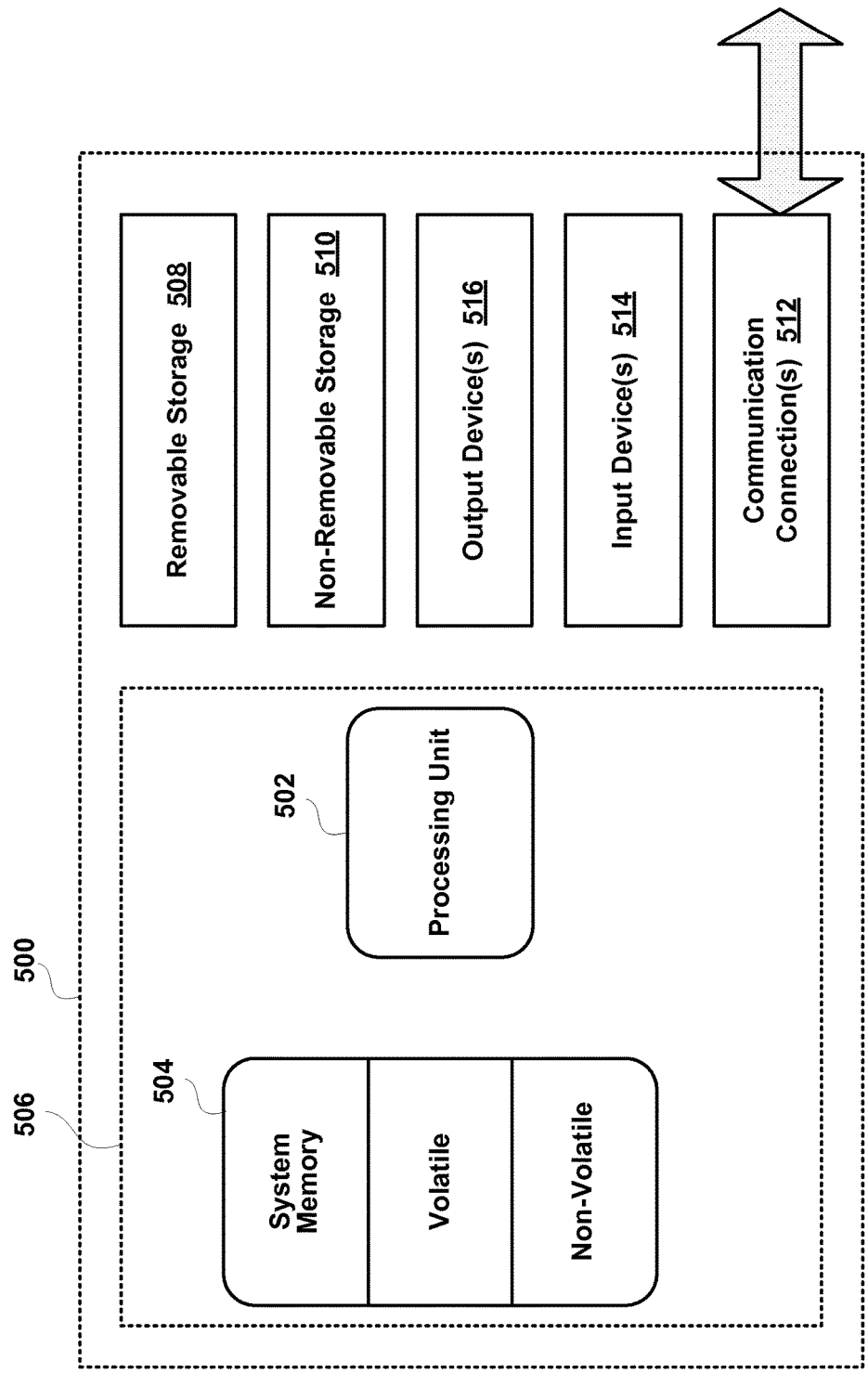
FIG. 5 is a diagram of an example of a suitable computing system environment on which embodiments may be implemented.

FIG. 5 illustrates an example of a suitable computing system environment 500 on which embodiments may be implemented. The computing system environment 500 is only one example of a suitable computing environment and is not intended to suggest any limitation as to the scope or functionality of the invention. Neither should be computing environment 500 be interpreted as having any dependency or requirement relating to any one or combination of components illustrated in the exemplary operating environment 500.

With reference to FIG. 5, an exemplary system for implementing embodiments includes a general purpose computing system environment, such as computing system environment 500. In its most basic configuration, computing system environment 500 typically includes at least one processing unit 502 and memory 504. Depending on the exact configuration and type of computing system environment, memory 504 may be volatile (such as RAM), nonvolatile (such as ROM, flash memory, etc.) or some combination of the two. This most basic configuration is illustrated in FIG. 5 by dashed line 505. Additionally, computing system environment 500 may also have additional features/functionality. For example, computing system environment 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and nonremovable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Thus, embodiments provide highly adaptable technology for globally provisioning a service. The technology is capable of intelligently assigning clients to appropriate (often the closest) deployment units for the purpose of receiving the service. Furthermore, embodiments allow for the dynamic addition or removal of a deployment unit by reassigning clients on the fly. Such architecture is ideal for supporting clients numbering in the millions.

The previous description of the disclosed embodiments is provided to enable any person skilled in the art to make or use the claimed subject matter. Various modifications to these embodiments will be readily apparent to those skilled in the art, and the generic principles defined herein may be applied to other embodiments without departing from the spirit or scope of the claimed subject matter. Thus, the claimed subject matter is not intended to be limited to the embodiments shown herein but is to be accorded the widest scope consistent with the principles and novel features disclosed herein.

What is claimed is:

1. A method of provisioning a service for a new client, the method comprising:
periodically synching a replica global provisioning directory that is geographically proximate to a provisioning server with a global provisioning directory that is geographically distant from the provisioning server, wherein the replica global provisioning directory contains information associated with deployment units suitable for providing a service to clients, the information associated with the deployment units comprising, for each deployment unit, geographic location information for locations that the deployment unit provides the service for;
receiving, at the provisioning server, a request for services for a client; and
in response to receiving the request for service, with the provisioning server,
determining a geographic location of the client based on the received request;
performing a search, based on the determined geographic location for the client, of the replica global provisioning directory for a deployment unit associated with the determined geographic location to assign to the client for providing the service to the client;
assigning the client to the deployment unit associated with the determined geographic location, as identified in the search of the replica global provisioning directory; and
transmitting, to the client, information for receiving the service from the assigned deployment unit.

2. The method of claim 1, further comprising:
receiving, by the assigned deployment unit, another request by the client to be provided the service;

in response to receiving the another request, authenticating, by the assigned deployment unit, the client; and when the client is authenticated, providing, by the assigned deployment unit, the service.

3. The method of claim 2, further comprising:

determining whether the client is to be reassigned to a new deployment unit; and in response to determining that the client is to be reassigned to a new deployment unit, providing reassignment information to the client.

4. The method of claim 2 wherein the client is to be reassigned when a new deployment unit more geographically proximate to the client than the assigned deployment unit is available.

5. The method of claim 1 wherein the location information comprises at least one of an account identifier, an account certificate, a license type, a transaction identifier, or a time zone.

6. The method of claim 1 wherein the information for receiving the service from the provisioned deployment unit comprises a uniform resource locator (URL) for the deployment unit, a first certificate corresponding to the assigned deployment unit, an authorization token, and a hash code.

7. The method of claim 6 wherein the authorization token comprises a name of the provisioning server.

8. The method of claim 6 wherein the hash code comprises a hash of the account identifier, transaction identifier, the URL corresponding to the assigned deployment unit, a URL corresponding to the provisioning server, and a second certificate corresponding to the provisioning server.

9. The method of claim 1, further comprising signing the information for receiving the service from the assigned deployment unit using an encryption key before transmitting the information for receiving the service to the new client.

10. A system for provisioning a service for a new client, the system comprising:

a memory storing computer-executable instructions of:

periodically synching a replica global provisioning directory that is geographically proximate to a provisioning server with a global provisioning directory that is geographically distant from the provisioning server, wherein the replica global provisioning directory contains information associated with deployment units suitable for providing a service to clients, the information associated with the deployment units comprising, for each deployment unit, geographic location information for locations that the deployment unit provides the service for;

receiving, at the provisioning server, a request for services for a client;

in response to receiving the request for service, with the provisioning server, determining a geographic location of the client based on the received request;

performing a search, based on the determined geographic location for the client, of the replica global provisioning directory for a deployment unit associated with the determined geographic location to assign to the client for providing the service to the client;

assigning the client to the deployment unit associated with the determined geographic location, as identified in the search of the replica global provisioning directory; and transmitting, to the client, information for receiving the service from the assigned deployment unit; and a processor for executing the computer-executable instructions stored in the memory.

11. The system of claim 10 wherein the computer-executable instructions further comprise:

receiving, by the deployment unit, another request by the client to be provided the service;

in response to receiving the another request, authenticating, by the deployment unit, the client; and when the client is authenticated, providing, by the deployment unit, the service.

12. The system of claim 11 wherein the computer-executable instructions further comprise:

determining whether a client is to be reassigned to a new deployment unit; and in response to determining that the client is to be reassigned to a new deployment unit, providing reassignment information to the client.

13. The system of claim 10 wherein the location information comprises at least one of an account identifier, an account certificate, a license type, a transaction identifier, or a time zone.

14. The system of claim 10 wherein the information for receiving the service from the assigned deployment unit comprises a uniform resource locator (URL) for the deployment unit, a first certificate corresponding to the assigned deployment unit, an authorization token, and a hash code.

15. The system of claim 14 wherein the authorization token comprises a name of the provisioning server.

16. The system of claim 14 wherein the hash code comprises a hash of the account identifier, transaction identifier, the URL corresponding to the assigned deployment unit, a URL corresponding to the provisioning server, and a second certificate corresponding to the provisioning server.

17. The system of claim 10, further comprising signing the information for receiving the service from the assigned deployment unit using an encryption key before transmitting the information for receiving the service to the new client.

18. A method of provisioning a service for a new client, the method comprising:

periodically synching a replica global provisioning directory that is geographically proximate to a provisioning server with a global provisioning directory that is geographically distant from the provisioning server, wherein the replica global provisioning directory contains information associated with deployment units suitable for providing a service to clients, the information associated with the deployment units comprising, for each deployment unit, geographic location information for locations that the deployment unit provides the service for;

receiving, at the provisioning server, a request for services for a client;

in response to receiving the request for service, with the provisioning server, determining a geographic location of the client based on the received request;

performing a search, based on the determined geographic location for the client, of the replica global provisioning directory for a deployment unit associated with the determined geographic location;

assigning the client to the deployment unit associated with the determined geographic location, as identified in the search of the replica global provisioning directory; and transmitting, to the client, information for receiving the service from the assigned deployment unit;

providing services to the client via the assigned deployment unit;

receiving an indication of a new assignment of a new deployment unit for the client; and transmitting, to the client, via the assigned deployment unit, need-reassignment information.

19. The method of claim 18, further comprising:

receiving, at the provisioning server, a subsequent request for services for the client; and transmitting, to the client, information for receiving the services from the new deployment unit.

20. The method of claim 19, further comprising:

receiving, by the new deployment unit, a request by the client to be provided the service;

authenticating, by the new deployment unit, the client; and when the client is authenticated, providing, by the new deployment unit, the service.

* * * * *